(12) United States Patent
Igarashi

(10) Patent No.: US 10,883,617 B2
(45) Date of Patent: Jan. 5, 2021

(54) VALVE

(71) Applicant: SURPASS INDUSTRY CO., LTD., Saitama (JP)

(72) Inventor: Hiroki Igarashi, Saitama (JP)

(73) Assignee: SURPASS INDUSTRY CO., LTD., Gyoda (JP)

(*) Notice: Subject to any disclaimer, the term of this patent is extended or adjusted under 35 U.S.C. 154(b) by 14 days.

(21) Appl. No.: 16/201,147

(22) Filed: Nov. 27, 2018

(65) Prior Publication Data
US 2019/0186647 A1 Jun. 20, 2019

(30) Foreign Application Priority Data
Dec. 19, 2017 (JP) .................. 2017-242799

(51) Int. Cl.
F16K 7/00 (2006.01)
F16K 31/122 (2006.01)
F16K 23/00 (2006.01)
F16K 31/126 (2006.01)

(52) U.S. Cl.
CPC ............... *F16K 23/00* (2013.01); *F16K 7/00* (2013.01); *F16K 31/1221* (2013.01); *F16K 31/1266* (2013.01)

(58) Field of Classification Search
CPC ............................ F16K 7/00; F16K 31/1221
USPC .................... 251/45, 46, 331, 335.3
See application file for complete search history.

(56) References Cited

U.S. PATENT DOCUMENTS

| 3,709,431 A | 1/1973 | Channell et al. |
| 5,178,304 A * | 1/1993 | Torterotot ............... B65B 3/32 222/333 |
| 6,270,055 B1 * | 8/2001 | Szeteli .................. F16L 37/28 251/335.3 |
| 8,251,345 B2 | 8/2012 | Inoue |
| 8,602,383 B2 * | 12/2013 | Inoue ..................... F16K 23/00 239/106 |
| 2010/0230626 A1 | 9/2010 | Inoue |

FOREIGN PATENT DOCUMENTS

JP 2009-068568 A 2/2009

OTHER PUBLICATIONS

Extended European Search Report dated Apr. 26, 2019; Appln. No. 18212044.4.

* cited by examiner

Primary Examiner — Paul J Gray

(57) ABSTRACT

To prevent a defect in which a liquid is retained in a vicinity of a valley of a bellows part and particles such as impurities are accumulated. Provided is a valve including a valve element part and a diaphragm part that is coupled to the valve element part. The diaphragm part includes a base, a tip part, and a bellows part that couples between the base and the tip part. A wetted part in contact with the liquid at the tip part is formed in a cylindrical shape extending along a shaft line X. A lower end part of the bellows part is connected to the wetted part in a connection position CP coinciding with an outer peripheral surface of the wetted part. The valley of the bellows part is disposed in the connection position CP.

6 Claims, 5 Drawing Sheets

VALVE

CROSS-REFERENCE TO RELATED APPLICATIONS

This application is based on Japanese Patent Application No. 2017-242799, the contents of which are incorporated herein by reference in its entirety.

TECHNICAL FIELD

The present disclosure relates to a valve.

BACKGROUND ART

Among opening/closing valves each installed in a pipe through which a liquid such as a chemical solution flows, there has been known a valve that performs a suck-back operation to prevent dripping that may occur during a full-close operation (see PTL 1, for example).

A suck-back valve disclosed in PTL 1 performs operations in two stages which are a valve closing operation stage of moving a valve element to a full-close position and a suck-back operation of increasing a space volume of a suck-back chamber.

CITATION LIST

Patent Literature

[PTL 1] Japanese Unexamined Patent Application, Publication No. 2009-68568

SUMMARY

Technical Problem

The suck-back valve disclosed in PTL 1 is provided with a diaphragm covering the top of the suck-back chamber and a bellows integrally formed with the diaphragm. The bellows is disposed in the suck-back chamber, and the lower end part of the bellows is coupled to the upper surface of a base of the diaphragm which is coupled to a valve element shaft. A space between the lower end part of the bellows and the base of the diaphragm is a space where a liquid hardly flows and the liquid tends to be retained. Hence there is a possibility that particles such as impurities are accumulated in this space and the accumulated particles are discharged to the outside at unexpected timing.

The present disclosure has been made in view of such circumstances, and it is an object of the present disclosure to provide a valve capable of preventing a defect in which a liquid is retained and particles such as impurities are accumulated in a vicinity of a valley of a bellows part.

Solution to Problem

For solving the above problem, the present disclosure adopts the following means:

A valve according to one aspect of the present disclosure includes: a housing part internally formed with an inlet flow path where a liquid flows in, an outlet flow path where the liquid flows out, and a valve hole that leads the liquid from the inlet flow path to the outlet flow path; a valve element part that comes into contact with or separates from a valve seat part disposed around the valve hole to bring the valve hole into a closed state or an open state; and a diaphragm part that is coupled to the valve element part. The diaphragm part includes a base, a tip part that is coupled to the valve element part and inserted into the valve hole, and a bellows part that couples between the base and the tip part and is formed with a valley adjacent to a peak. A wetted part in contact with the liquid at the tip part is formed in a cylindrical shape extending along a shaft line. A lower end part of the bellows part is connected to the wetted part in a connection position coinciding with an outer peripheral surface of the wetted part. The valley of the bellows part is disposed in the connection position.

According to the valve of one aspect of the present disclosure, the lower end part of the bellows part is connected to the wetted part in the connection position coinciding with the outer peripheral surface of the wetted part which is coupled to the valve element part, and the valley of the bellows part is disposed in the connection position. Hence the entire region of the bellows part from the valleys to the peak exists in a flowing direction of the liquid flowing upward along the shaft line between the valve hole and the wetted part. It is thereby possible to prevent a defect in which a liquid is retained and particles such as impurities are accumulated in the vicinity of the valley of the bellows part.

The valve according to one aspect of the present disclosure includes: a piston part that is accommodated in the housing so as to be movable along the shaft line and receives a first urging force acting downward in the shaft line from pressure of a fluid introduced from an outside of the housing; and an urging force generation part that transmits to the piston part a second urging force acting upward in the shaft line. The diaphragm part may be coupled to both the valve element part and the piston part and separates the liquid from a space in which the piston part is disposed.

According to the suck-back valve of one aspect of the present disclosure, when the piston part having received the first urging force from the pressure of the fluid introduced from the outside moves downward in the shaft line, the first urging force is transmitted to the valve element part via the diaphragm part. When the valve hole comes into the open state by the first urging force, the liquid flows into the outlet flow path from the inlet flow path via the valve hole. Thereafter, when the pressure of the fluid introduced from the outside is weakened and the second urging force generated by the urging force generation part exceeds the first urging force, the valve element part comes into contact with the valve hole to bring the valve hole into the closed state to block the supply of the liquid to the outlet flow path. The piston part then moves upward along the shaft line by the second urging force, and with this movement, the diaphragm part moves upward to cause an increase in volume of the outlet flow path. Upon increase in volume of the outlet flow path, the suck-back operation is performed to suck the liquid in the outlet flow path, and it is thus possible to prevent dripping that may occur during a full-close operation.

In the valve according to one aspect of the present disclosure, the bellows part may be obtained by forming a pair of the valleys adjacent to the single peak.

Since there is no other peak adjacent to the single peak, a large retention region is not formed in a valley between adjacent peaks. It is thus possible to further prevent a defect in which a liquid is retained and particles such as impurities are accumulated in the vicinity of the valley of the bellows part.

In the valve according to one aspect of the present disclosure, when the lower end part of the piston part comes into contact with the tip part of the diaphragm part to bring the valve hole into the open state, an angle formed by a pair of inclined surfaces of the bellows part may be 30° or larger, the inclined surfaces being inclined from the peak toward the pair of valleys adjacent to the peak.

By setting the angle formed by the pair of inclined surfaces to 30° or larger, the liquid easily flows into the pair of valleys adjacent to the peak, and it is thus possible to further prevent a defect in which a liquid is retained in the vicinity of the valley of the bellows part.

In the valve with the above configuration, when the lower end part of the piston part comes into contact with the tip part of the diaphragm part to bring the valve hole into the open state, an angle formed by the pair of inclined surfaces of the bellows part may be 40° or smaller.

When the angle formed by the pair of inclined surfaces is made excessively large, an extension amount of the bellows part decreases. By setting the angle formed by the pair of inclined surfaces to 40° or smaller, the extension amount of the bellows can be ensured sufficiently.

Advantageous Effects

According to the present disclosure, it is possible to provide a valve capable of preventing a defect in which a liquid is retained and particles such as impurities are accumulated in a vicinity of a valley of a bellows part.

DESCRIPTION OF EMBODIMENTS

First Embodiment

Hereinafter, a valve according to a first embodiment of the present disclosure will be described with reference to the drawings.

A suck-back valve 100 of the present embodiment is installed in a flow path where a liquid such as a chemical solution, used for a semiconductor manufacturing device, is caused to flow. The suck-back valve 100 has a suck-back function to prevent dripping when fully closed.

Figure 1:
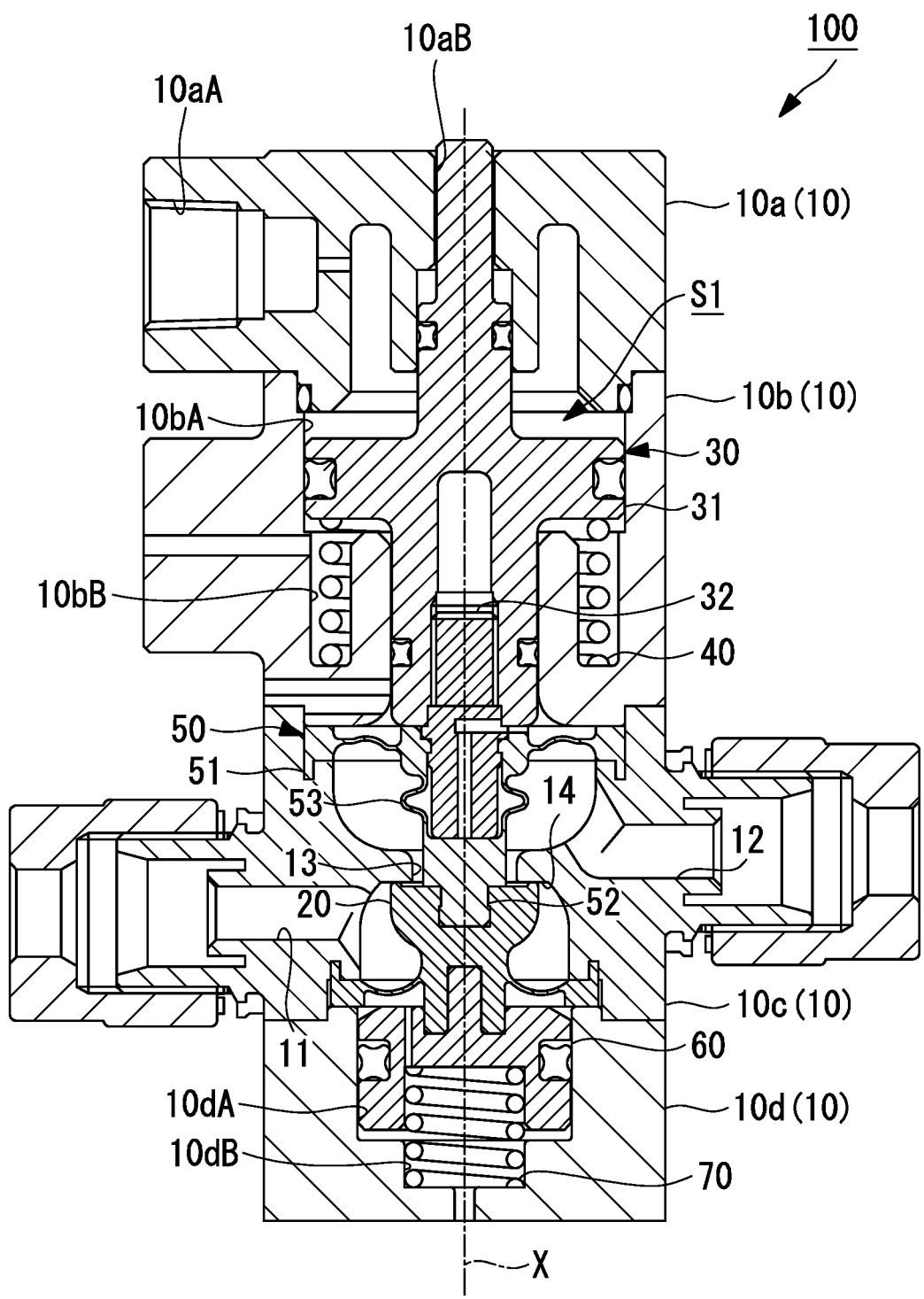
FIG. 1 is a longitudinal sectional view showing a closed state of a suck-back valve.
Figure 2:
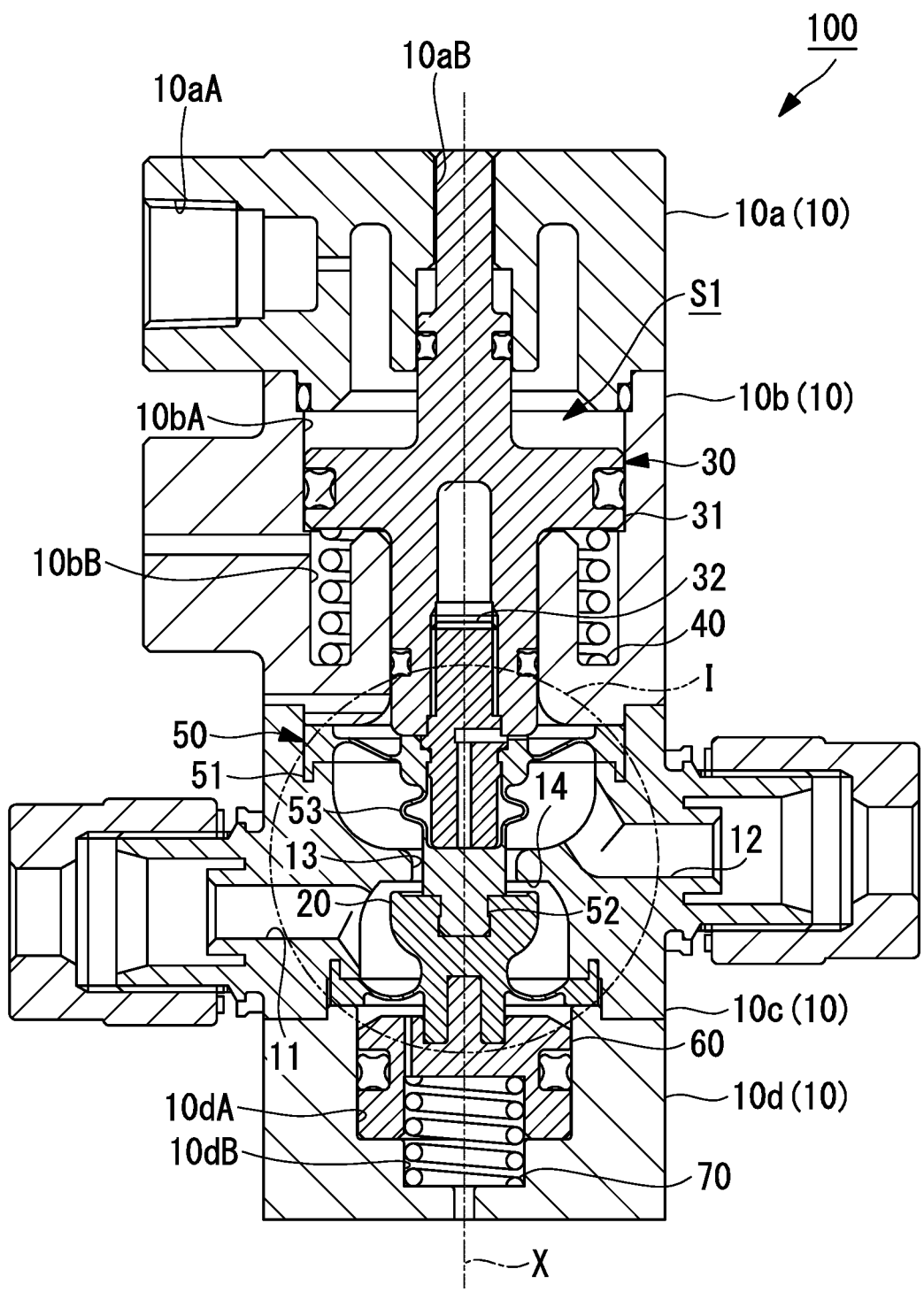
FIG. 2 is a longitudinal sectional view showing an open state of the suck-back valve.
Figure 3:
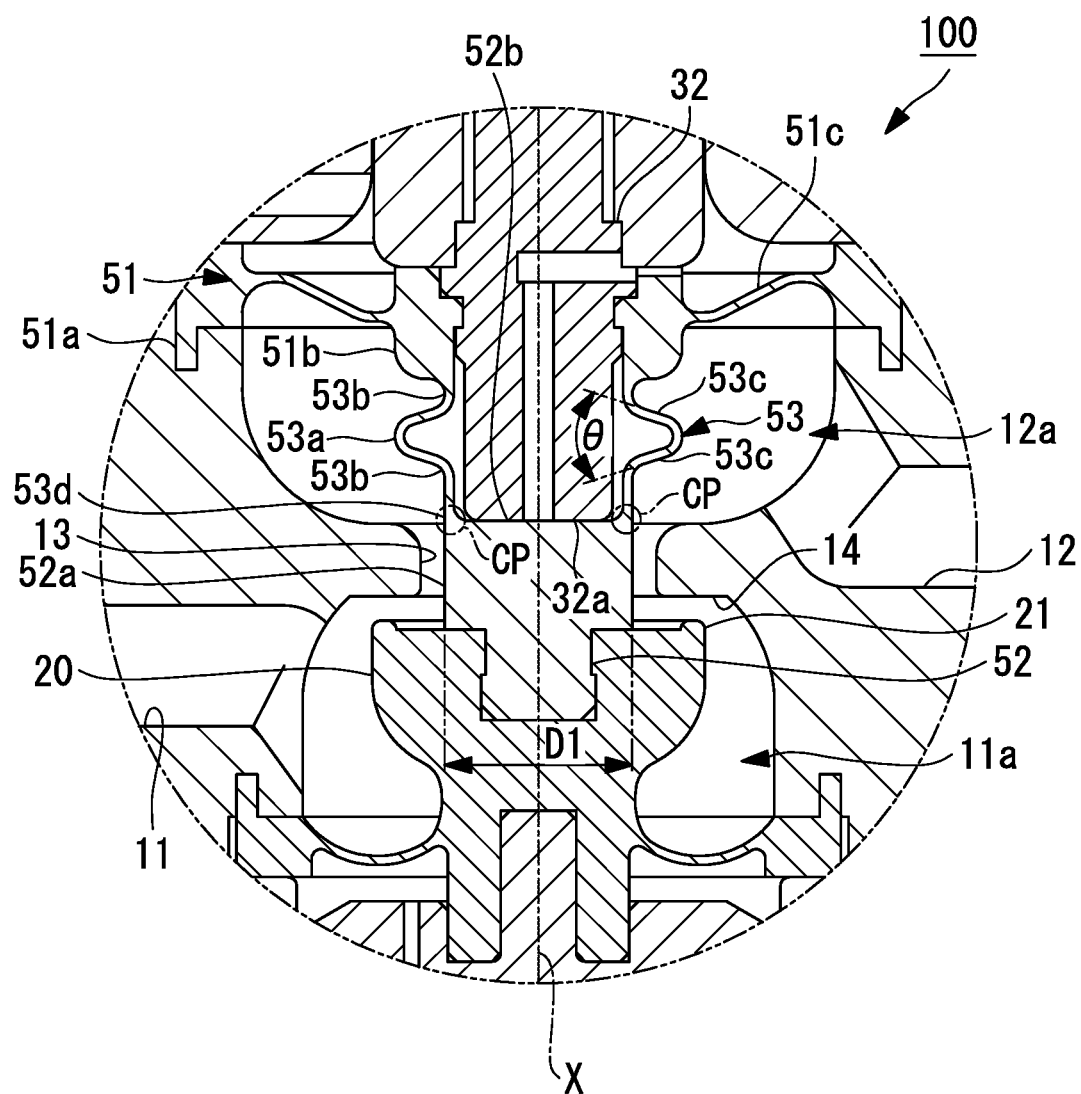
FIG. 3 is a partially enlarged view of a portion I of FIG. 2.
Figure 4:
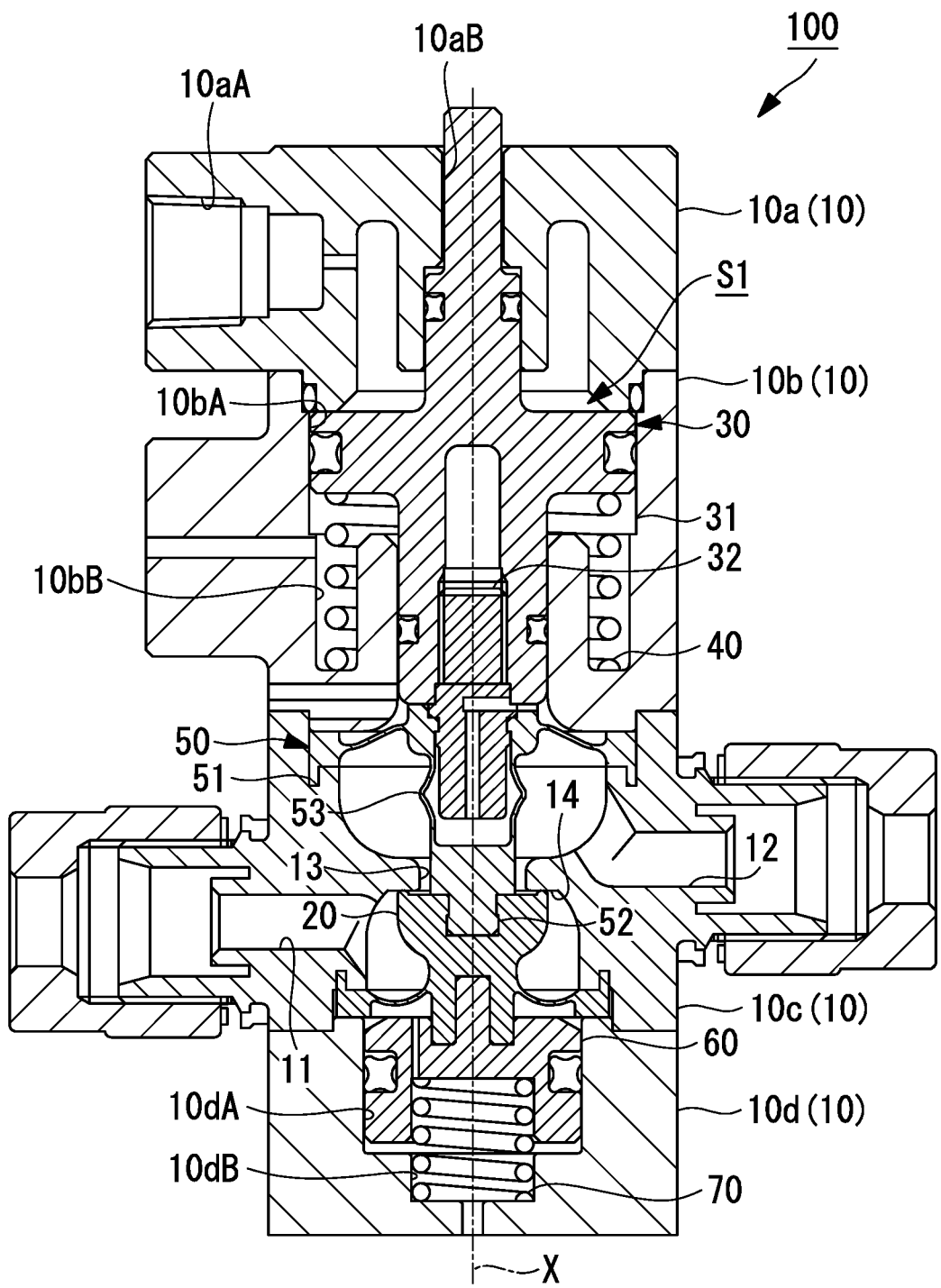
FIG. 4 is a longitudinal sectional view showing a state where a suck-back operation of the suck-back valve has been completed.

FIG. 1 is a longitudinal sectional view showing a fully closed state of the suck-back valve 100, and FIG. 2 is a longitudinal sectional view showing a fully open state of the suck-back valve 100. FIG. 3 is a partially enlarged view showing a portion I of FIG. 2. FIG. 4 is a longitudinal sectional view showing a state where a suck-back operation of the suck-back valve 100 has been completed.

The suck-back valve 100 of the present embodiment is provided with a housing part 10, a valve element part 20, a first piston part 30, a first spring (urging force generation part) 40, a diaphragm part 50, a second piston part 60, and a second spring 70.

The housing part 10 is a casing for internally accommodating the valve element part 20, the first piston part 30, the first spring (urging force generation part) 40, the diaphragm part 50, the second piston part 60, and the second spring 70. The housing part 10 includes a first housing 10a, a second housing 10b, a third housing 10c, and a fourth housing 10d. The third housing 10c is formed of a fluorocarbon resin material (e.g., polytetrafluoroethylene (PTFE), denatured PTFE, polytetrafluoroethylene (PFA)).

Each of the first housing 10a, the second housing 10b, the third housing 10c, and the fourth housing 10d is formed with a through hole extending in a direction of a shaft line X shown in FIG. 1. A fastening bolt (not shown) is inserted into the through hole in each housing and then fastened together with a fastening nut, so that each housing comes into the state of being coupled to one another.

The first housing 10a is a casing disposed on an uppermost position. The first housing 10a is formed with an introduction port 10aA into which a compressed air (fluid) is introduced from an external compressed air supply source (not shown), and a through hole 10aB into which the first piston part 30 is movably inserted.

The second housing 10b is a casing disposed below the first housing 10a. The second housing 10b is formed with a through hole 10bA into which the first piston part 30 is movably inserted, and a holding hole 10bB in which the first spring 40 is held. A pressure chamber S1 is formed between the first housing 10a and the second housing 10b, the chamber being a space where the compressed air is introduced from the introduction port 10aA and the first piston part 30 is disposed.

The third housing 10c is a casing disposed below the second housing 10b. The third housing 10c is internally formed with an inlet flow path 11 where a liquid flows in from an external tube (not shown), an outlet flow path 12 where the liquid having flown in from the inlet flow path 11 flows out to an external tube (not shown), and a valve hole 13 that leads the liquid from the inlet flow path 11 to the outlet flow path 12. The inlet flow path 11 is a flow path inclined downward to a valve chamber 11a in which the valve element part 20 is disposed. Hence the liquid led from the inlet flow path 11 into the valve chamber 11a flows in the entire valve chamber 11a including its lower end part, and a liquid retention region is not formed in the valve chamber 11a. Further, the outlet flow path 12 is a flow path inclined downward from the upper end of the suck-back chamber 12a in which a bellows part 53 is disposed. Hence the liquid led from the suck-back chamber 12a to the outlet flow path 12 flows in the entire suck-back chamber 12a including its upper end part, and a liquid retention region is not formed in the suck-back chamber 12a.

The inner peripheral surface of each of the inlet flow path 11 and the outlet flow path 12 is processed to have an average roughness of 0.8 a or smaller by cutting or molding. When the inner peripheral surface of each of the inlet flow path 11 and the outlet flow path 12 is made to have an average roughness of 0.8 a or smaller, the third housing 10c is desirably formed using polytetrafluoroethylene (PFA) by injection molding. Forming the inner peripheral surface of each of the inlet flow path 11 and the outlet flow path 12 by injection molding is more advantageous than forming the same by cutting in terms of reduction in particles.

The fourth housing 10d is a casing disposed below the third housing 10c and in the lowermost position. The fourth housing 10d is formed with an insertion hole 10dA into which the second piston part 60 is movably inserted, and a holding hole 10dB in which the second spring 70 is held.

The valve element part 20 is a member that comes into contact with or separates from the valve seat part 14 disposed around the valve hole 13 to bring the valve hole into the open state or the closed state. As shown in FIG. 3, the valve element part 20 is accommodated in the valve chamber 11a disposed at the downstream end of the inlet flow path 11. The valve element part 20 brings the valve hole 13 into the closed state by bringing the contact part 21 into contact with the valve seat part 14 having a planar shape and orthogonal to the shaft line X, to form an annular sealing region, the contact part 21 being formed into an annular shape around the shaft line X at the outer peripheral end of the upper end of the valve element part 20 and having a tip part formed in a planar shape. The tip of the contact part 21 and the valve seat part 14 each have the planar shape, thereby preventing particles from being generated due to repetition of contact and separation of the contact part 21 and the valve seat part 14. The contact part 21 and the valve seat part 14 are each processed to have an average roughness of 0.1 a or smaller. The outer peripheral surface of the valve element part 20 except for the contact part 21 is processed to have an average roughness of 0.8 a or smaller by cutting or molding.

The first piston part 30 is a member movably accommodated in the housing part 10 along the shaft line X. The first piston part 30 includes a piston body 31, and a shaft 32 fixed at the lower end of the piston body 31. The first piston part 30 receives a downward urging force (first urging force) acting downward in the shaft line X from the pressure of the compressed air introduced from the introduction port 10aA into the pressure chamber S1. Further, an upward urging force (second urging force) acting upward in the shaft line X is transmitted from the first spring 40 to the first piston part 30. The first piston part 30 moves downward along the shaft line X when the downward urging force exceeds the upward urging force, and the first piston part 30 moves upward along the shaft line X when the upward urging force exceeds the downward urging force.

The first spring 40 is an elastic member that is held in the holding hole 10bB of the second housing 10b and transmits the upward urging force acting upward in the shaft line X to the first piston part 30. The upward urging force transmitted to the first piston part 30 by the first spring 40 is used as a motive power that increases the volume of the outlet flow path 12 after bringing the valve hole 13 into the closed state.

As shown in FIG. 3, the diaphragm part 50 is an isolation member that isolates the liquid in the suck-back chamber 12a of the outlet flow path 12 from the space including the pressure chamber S1 in which the first piston part 30 is disposed. As shown in FIGS. 2 and 3, the diaphragm part 50 includes a base 51 coupled to the shaft 32 of the first piston part 30, a tip part 52 coupled to the valve element part 20, and the bellows part 53 that couples between the base 51 and the tip part 52. The diaphragm part 50 is a member formed by integrally molding the base 51, the tip part 52, and the bellows part 53 with a fluorocarbon resin material (e.g., PTFE). The portion of the diaphragm part 50 which is in contact with the liquid is processed to have an average roughness of 0.8 a or smaller by cutting or molding.

As shown in FIG. 3, the base 51 includes a circular outer periphery 51a held in the state of being placed between the second housing 10b and the third housing 10c, a circular inner periphery 51b coupled to the outer peripheral surface of the shaft 32 of the first piston part 30, and a thin film part 52c having a thin-film shape and connecting between the inner peripheral end of the outer periphery 51a and the outer peripheral end of the inner periphery 51b.

As shown in FIG. 3, the tip part 52 includes a wetted part 52a in contact with the liquid in the vicinity of the valve hole 13. The wetted part 52a is formed in a cylindrical shape extending along the shaft line X, while being inserted into the valve hole 13. The wetted part 52a is a member having a fixed outer diameter D1 with the shaft line X at the center. The lower end of the tip part 52 is fixed in the state of being fitted in a recess provided in the valve element part 20.

As shown in FIG. 3, the bellows part 53 is a member formed with a single peak 53a protruding to the outer peripheral side with the shaft line X at the center, and a pair of valleys 53b disposed in an upper part and a lower part which are adjacent to the peak 53a, the member being extendable along the shaft line X. A lower end part 53d of the bellows part 53 is connected to the wetted part 52a in a connection position CP radially coinciding with the position of the outer peripheral surface of the wetted part 52a. The valley 53b of the bellows part 53 is disposed at the same position as the connection position CP in a radial direction orthogonal to the shaft line X.

As shown in FIG. 3, the length of the bellows part 53 along the shaft line X comes into the most contracted state when a lower end part 32a of the shaft 32 of the first piston part 30 comes into contact with a bottom surface 52b of the tip part 52 of the diaphragm part 50 to bring the valve hole 13 into the open state. In this state, an angle formed by a pair of inclined surfaces 53c of the bellows part 53, inclined from the peak 53a toward the pair of valleys 53b is an angle θ. The angle θ is desirable set in a range from 30° to 40°. By setting the angle θ to 30° or larger, the liquid easily flows into the pair of valleys 53b adjacent to the peak 53a, making it possible to further prevent a defect in which the liquid is retained in the vicinity of the valley of the bellows part 53. Moreover, by setting the angle θ to 40° or smaller, it is possible to sufficiently ensure the volume of the outlet flow path 12 which increases by the suck-back operation and to reliably prevent dripping that may occur during the full-close operation.

The second piston part 60 is a member movably accommodated in the fourth housing 10d along the shaft line X. An upward urging force acting upward in the shaft line X is transmitted from the second spring 70 to the second piston part 60. The second piston part 60 moves downward along the shaft line X when the downward urging force, transmitted from the first piston part 30 via the diaphragm part 50, exceeds the upward urging force, and the second piston part 60 moves upward along the shaft line X when the upward urging force exceeds the downward urging force.

The second spring 70 is an elastic member that is held in the holding hole 10bB of the fourth housing 10d and transmits the upward urging force acting upward in the shaft line X to the second piston part 60.

Next, the operation of the suck-back valve 100 of the present embodiment will be described.

First, the closed state of the suck-back valve 100 will be described.

When the upward urging force, transmitted from the first spring 40 to the first piston part 30, is larger than the downward urging force applied from the pressure chamber S1 to the first piston part 30, the suck-back valve 100 is kept in the closed state shown in FIG. 1. In the closed state shown in FIG. 1, the valve element part 20 comes into contact with the valve seat part 14 by the upward urging force transmitted from the second spring 70 to the second piston part 60 to bring the valve hole 13 into the closed state.

Next, the open state of the suck-back valve 100 will be described.

When the downward urging force, applied from the pressure chamber S1 to the first piston part 30, exceeds the upward urging force transmitted from the first spring 40 to the first piston part 30, the suck-back valve 100 comes into the open state shown in FIG. 2. In the open state shown in FIG. 2, the downward urging force, transmitted from the first piston part 30 to the second piston part 60 via the diaphragm part 50, exceeds the upward urging force which is transmitted from the second spring 70 to the second piston part 60, the valve element part 20 separates from the valve seat part 14 to bring the valve hole 13 into the open state.

Finally, the suck-back operation of the suck-back valve 100 will be described.

When the pressure of the pressure chamber S1 is decreased from the open state of the suck-back valve 100 shown in FIG. 2, the upward urging force, transmitted from the second spring 70 to the second piston part 60 becomes larger than the downward urging force which is transmitted from the first piston part 30 to the second piston part 60 via the diaphragm part 50, the valve element part 20 comes into contact with the valve seat part 14 to bring the valve hole 13 into the closed state shown in FIG. 1.

Then, when the pressure of the pressure chamber S1 is further decreased, the upward urging force, transmitted from the first spring 40 to the first piston part 30, becomes larger than the downward urging force applied from the pressure chamber S1 to the first piston part 30, and the lower end part 32a of the shaft 32 is separated from the bottom surface 52b of the diaphragm part 50. When the first piston part 30 further moves upward along the shaft line X, a thin film part 52c of the diaphragm part 50 rises while the bellows part 53 extends, to increase the volume of the suck-back chamber 12a. When the volume of the suck-back chamber 12a increases, the liquid is sucked from a pipe (not illustrated) connected to the outlet flow path 12 to the outlet flow path 12 side to enable prevention of dripping.

A description will be given of an action and an effect exerted by the suck-back valve 100 of the present embodiment described above.

According to the suck-back valve 100 of the present embodiment, when the first piston part 30, having received the downward urging force from the pressure of the compressed air introduced from the outside, moves downward in the shaft line X, the downward urging force is transmitted to the valve element part 20 via the diaphragm part 50. When the valve hole 13 comes into the open state by the downward urging force, the liquid flows into the outlet flow path 12 from the inlet flow path 11 via the valve hole 13. Thereafter, when the pressure of the compressed air introduced from the outside is weakened and the upward urging force generated by the first spring 40 exceeds the downward urging force, the valve element part 20 comes into contact with the valve hole 13 and the valve hole 13 comes into the closed state to block the supply of the liquid to the outlet flow path 12. The first piston part 30 then moves upward along the shaft line X by the upward urging force, and with this movement, the diaphragm part 50 moves upward to cause an increase in volume of the outlet flow path 12. Upon increase in volume of the outlet flow path 12, the suck-back operation is performed to suck the liquid in the outlet flow path 12, and it is thus possible to prevent dripping that may occur during the full-close operation.

According to the suck-back valve 100 of the present embodiment, the lower end part 53d of the bellows part 53 is connected to the wetted part 52a in the connection position CP coinciding with the outer peripheral surface of the wetted part 52a which is coupled to the valve element part 20, and the valley 53b of the bellows part 53 is disposed in the connection position CP. Hence the entire region of the bellows part 53 from the valleys 53b to the peak 53a exists in a flowing direction of the liquid flowing upward along the shaft line X between the valve hole 13 and the wetted part 52a. It is thereby possible to prevent a defect in which a liquid is retained and particles such as impurities are accumulated in the vicinity of the valley 53b of the bellows part 53.

In the suck-back valve 100 of the present embodiment, the bellows part 53 is obtained by forming the pair of the valleys 53b adjacent to the single peak 53a.

Since there is no other peak 53a adjacent to the single peak 53a, a large retention region is not formed in the valley 53b between the adjacent peaks 53a. It is thus possible to prevent a defect in which a liquid is retained and particles such as impurities are accumulated in the vicinity of the valley 53b of the bellows part 53.

In the suck-back valve 100 of the present embodiment, when the lower end part 32a of the first piston part 30 comes into contact with the tip part 52 of the diaphragm part 50 and the valve hole 13 comes into the open state, the angle formed by the pair of inclined surfaces 53c of the bellows part 53 is 30° or larger, the inclined surfaces being inclined from the peak 53a toward the pair of valleys 53b adjacent to the peak.

By setting the angle formed by the pair of inclined surfaces 53c to 30° or larger, the liquid easily flows into the pair of valleys 53b adjacent to the peak 53a, and it is thus possible to further prevent a defect in which a liquid is retained in the vicinity of the valley 53b of the bellows part 53.

In the suck-back valve 100 of the present embodiment, when the lower end part 32a of the first piston part 30 comes into contact with the tip part 52 of the diaphragm part 50 and the valve hole 13 comes into the open state, the angle formed by the pair of inclined surfaces 53c of the bellows part 53 is 40° or smaller.

When the angle formed by the pair of inclined surfaces 53c is made excessively large, an extension amount of the bellows part 53 decreases, thus leading to a decrease in volume of the outlet flow path 12 which increases by the suck-back operation. Moreover, by setting the angle θ formed by the pair of inclined surfaces 53c to 40° or smaller, it is possible to sufficiently ensure the volume of the outlet flow path 12 which increases by the suck-back operation and to reliably prevent dripping that may occur during the full-close operation.

Second Embodiment

Next, a valve according to a second embodiment of the present disclosure will be described with reference to the drawings.

The present embodiment is a modified example of the first embodiment and is assumed to be similar to the first embodiment except for a case particularly described below.

A constant flow-rate valve 100A of the present embodiment is installed in a flow path where a liquid such as a chemical solution used for a semiconductor manufacturing device is caused to flow, and has a function to circulate a liquid at a constant flow rate when fully open.

Figure 5:
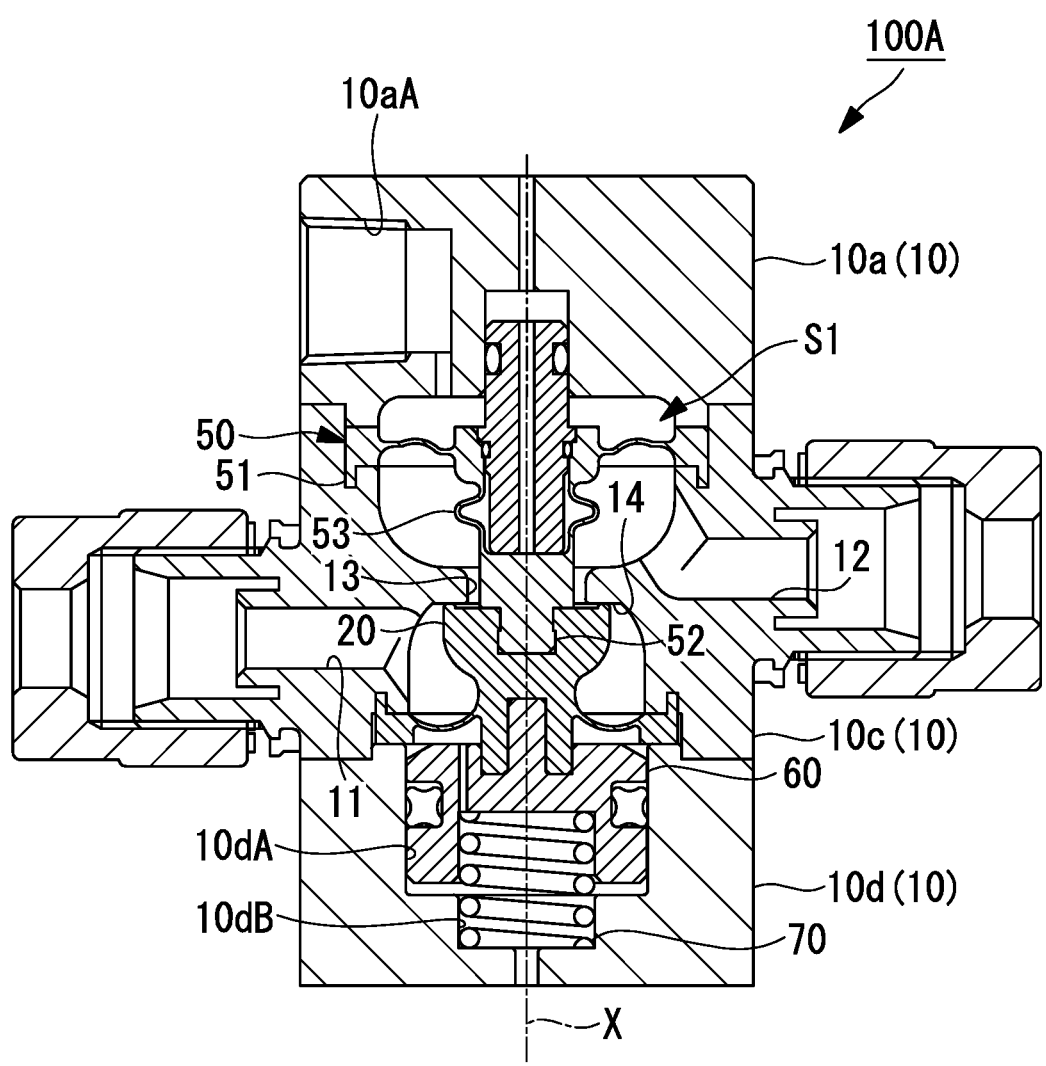
FIG. 5 is a longitudinal sectional view showing a closed state of a constant flow-rate valve.

As shown in FIG. 5, the constant flow-rate valve 100A of the present embodiment is not provided with the first piston part 30, the first spring 40, or the second housing 10b of the suck-back valve 100 of the first embodiment.

An operation of the constant flow-rate valve 100A of the present embodiment will be described.

First, the closed state of the constant flow-rate valve 100A will be described.

When the upward urging force, transmitted from the second spring 70 to the diaphragm part 50, is larger than the downward urging force applied from the pressure chamber S1 to the diaphragm part 50, the constant flow-rate valve 100A is kept in the closed state shown in FIG. 5. In the closed state shown in FIG. 5, the valve element part 20 comes into contact with the valve seat part 14 by the upward urging force transmitted from the second spring 70 to the second piston part 60 to bring the valve hole 13 into the closed state.

Next, the open state of the constant flow-rate valve 100A will be described.

When the downward urging force, applied from the pressure chamber S1 to the diaphragm part 50, exceeds the upward urging force transmitted from the second spring 70 to diaphragm part 50, the valve element part 20 separates from the valve seat part 14 to bring the valve hole 13 into the open state. When the lower surface of the second piston part 60 comes into contact with the fourth housing 10d, the valve hole 13 is kept in the state of its opening being constant. As a result, the liquid circulates at a constant flow rate from the inlet flow path 11 to the outlet flow path 12 via the valve hole 13.

The diaphragm part 50 of the present embodiment is similar to the diaphragm part 50 of the first embodiment. That is, according to the constant flow-rate valve 100A of the present embodiment, the lower end part 53d of the bellows part 53 is connected to the wetted part 52a in the connection position CP coinciding with the outer peripheral surface of the wetted part 52a which is coupled to the valve element part 20, and the valley 53b of the bellows part 53 is disposed in the connection position CP. Hence the entire region of the bellows part 53 from the valleys 53b to the peak 53a exists in a flowing direction of the liquid flowing upward along the shaft line X between the valve hole 13 and the wetted part 52a. It is thereby possible to prevent a defect in which a liquid is retained and particles such as impurities are accumulated in the vicinity of the valley 53b of the bellows part 53.

OTHER EMBODIMENTS

In the above description, the bellows part 53 has been obtained by forming the pair of valleys 53b adjacent to the single peak 53a, but this may be in another aspect. For example, the bellows part 53 may be obtained by forming a plurality of peaks 53a and a plurality of valleys 53b adjacent thereto. In this case, similarly to what has been described above, the angle θ formed by the pair of inclined surfaces 53c, inclined from the peak 53a toward the pair of valleys 53b, is desirable set in a range from 30° to 40°. This enables prevention of a defect in which a liquid is retained and particles such as impurities are accumulated in the vicinity of the valley 53b of the bellows part 53.

Further, in the above description, the upward urging force acting upward in the shaft line X has been transmitted from the second spring 70 to the second piston part 60, but this may be in another aspect. For example, the upward urging force acting upward in the shaft line X from the pressure of the compressed air may be transmitted to the second piston part 60.

REFERENCE SIGNS LIST

10 housing part
10a first housing
10aA introduction port
10b second housing
10bA through hole
10bB holding hole
10c third housing
10d fourth housing
10dA insertion hole
10dB holding hole
11 inlet flow path
11a valve chamber
12 outlet flow path
12a suck-back chamber
13 valve hole
14 valve seat part
20 valve element part
21 contact part
30 first piston part
31 piston body
32 shaft
32a lower end part
40 first spring (urging force generation part)
50 diaphragm part
51 base
51a outer periphery
51b inner periphery
51c thin film part
52 tip part
52a wetted part
52b bottom surface
53 bellows part
53a peak
53b valley
53c inclined surface
53d lower end part
60 second piston part
70 second spring
100 suck-back valve
S1 pressure chamber (space)
CP connection position
X shaft line

The invention claimed is:

1. A valve comprising:
a housing part internally formed with an inlet flow path where a liquid flows in, an outlet flow path where the liquid flows out, and a valve hole that leads the liquid from the inlet flow path to the outlet flow path;
a valve element part that comes into contact with or separates from a valve seat part disposed around the valve hole to bring the valve hole into a closed state or an open state, the valve element part being disposed in a first chamber in which the liquid from the inlet flow path flows to; and
a diaphragm part that is coupled to the valve element part, wherein
the diaphragm part includes
a base,
a tip part that is coupled to the valve element part and inserted into the valve hole, and
a bellows part that couples between the base and the tip part and is formed with a valley adjacent to a peak, the bellows part being disposed in a second chamber in which the liquid from the first chamber flows to via the valve hole,
a wetted part in contact with the liquid at the tip part is formed in a cylindrical shape extending along a shaft line and the wetted part extends through the valve hole,
a lower end part of the bellows part is connected to the wetted part in a connection position coinciding with an outer peripheral surface of the wetted part in a radial direction orthogonal to the shaft line, the valley of the bellows part is disposed in the same position as the connection position in the radial direction, and the bellows part includes a portion thereof in between the valley and the peak which is positioned radially in between an outer circumference of the valve hole and an outer surface of the wetted part with respect to the shaft line.

2. The valve according to claim 1, comprising:

a piston part that is accommodated in the housing so as to be movable along the shaft line and receives a first urging force acting downward in the shaft line from pressure of a fluid introduced from an outside of the housing; and an urging force generation part that transmits to the piston part a second urging force acting upward in the shaft line, wherein the diaphragm part is coupled to both the valve element part and the piston part and separates the liquid from a space in which the piston part is disposed.

3. The valve according to claim 1, wherein the bellows part is obtained by forming a pair of the valleys adjacent to the single peak.

4. The valve according to claim 2, wherein, when a lower end part of the piston part comes into contact with the tip part of the diaphragm part to bring the valve hole into the open state, an angle formed by a pair of inclined surfaces of the bellows part is 30° or larger, the inclined surfaces being inclined from the peak toward the pair of valleys adjacent to the peak.

5. The valve according to claim 4, wherein, when the lower end part of the piston part comes into contact with the tip part of the diaphragm part to bring the valve hole into the open state, an angle formed by the pair of inclined surfaces of the bellows part is 40° or smaller.

6. The valve according to claim 2, wherein the bellows part is obtained by forming a pair of the valleys adjacent to the single peak.

* * * * *